United States Patent [19]

Aguilar et al.

[11] Patent Number: 5,867,640
[45] Date of Patent: Feb. 2, 1999

[54] APPARATUS AND METHOD FOR IMPROVING WRITE-THROUGHPUT IN A REDUNDANT ARRAY OF MASS STORAGE DEVICES

[75] Inventors: Gale Ramon Aguilar, Gilroy; Thomas E. Idelman, Santa Clara, both of Calif.

[73] Assignee: MTI Technology Corp., Anaheim, Calif.

[21] Appl. No.: 918,672

[22] Filed: Aug. 21, 1997

Related U.S. Application Data

[63] Continuation of Ser. No. 616,919, Mar. 18, 1996, abandoned, which is a continuation of Ser. No. 70,615, Jun. 1, 1993, abandoned.

[51] Int. Cl.⁶ .................................................. G06F 11/00
[52] U.S. Cl. ................... 395/182.04; 371/40.11; 371/40.2
[58] Field of Search .................. 395/182.03, 182.04; 371/40.11, 40.12, 40.13, 40.14, 40.15, 40.16, 40.17, 40.18, 40.2, 40.3, 40.4

[56] References Cited

U.S. PATENT DOCUMENTS

| | | | |
|---|---|---|---|
| 3,303,482 | 2/1967 | Jenkins | 340/174.1 |
| 3,693,159 | 9/1972 | Hilberg | 340/172.5 |
| 3,772,652 | 11/1973 | Hilberg | 340/172.5 |
| 3,803,560 | 4/1974 | DeVoy et al. | 340/172.5 |
| 3,905,023 | 9/1975 | Perpiglia | 340/172.5 |
| 3,917,933 | 11/1975 | Scheuneman et al. | 235/153 AK |
| 4,093,985 | 6/1978 | Das | 364/200 |
| 4,339,804 | 7/1982 | Davison et al. | 364/900 |
| 4,413,339 | 11/1983 | Riggle et al. | 371/38 |
| 4,464,747 | 8/1984 | Groudan et al. | 371/50 |
| 4,468,731 | 8/1984 | Johnson et al. | 364/200 |
| 4,507,730 | 3/1985 | Johnson et al. | 364/200 |
| 4,722,085 | 1/1988 | Flora et al. | 371/38 |
| 4,761,785 | 8/1988 | Clark et al. | 371/51 |
| 4,768,197 | 8/1988 | Petoline et al. | 371/37.3 |
| 4,825,403 | 4/1989 | Gershenson et al. | 364/900 |
| 4,914,656 | 4/1990 | Dunphy, Jr. et al. | 371/10.2 |
| 4,958,351 | 9/1990 | Flora et al. | 371/40.1 |
| 5,077,736 | 12/1991 | Dunphy, Jr. et al. | 371/10.1 |
| 5,134,619 | 7/1992 | Henson et al. | 371/40.1 |
| 5,140,592 | 8/1992 | Idleman et al. | 371/8.1 |
| 5,233,616 | 8/1993 | Collander | 371/37.7 |
| 5,239,640 | 8/1993 | Froemke et al. | 395/425 |
| 5,315,602 | 5/1994 | Noya et al. | 371/40.4 |
| 5,485,598 | 1/1996 | Kashima et al. | 395/182.04 |

OTHER PUBLICATIONS

"Write–Only Disk Caches", Solworth et al., 1990 ACM 089791–365–6/90/00050123.

"The IBM 3990 Disk Cache", Menon et al., CH2539–5/88/0000/0146, 1988 IEEE.

Primary Examiner—Robert W. Beausoliel, Jr.
Assistant Examiner—Pierre Eddy Elisca
Attorney, Agent, or Firm—Townsend and Townsend and Crew LLP

[57] ABSTRACT

A method and apparatus are provided for improving write throughput in a redundant array of mass storage devices using a cache memory to store redundant terms or code words generated when data is written to one or more devices in the array. The cache memory improves the write-throughput performance of the array by eliminating the need to perform a read-modify-write operation on check data stored in the mass storage devices of the array each time a write request is made. As a result, write-throughput of the system, particularly at peak demand periods, is improved.

15 Claims, 10 Drawing Sheets

APPARATUS AND METHOD FOR IMPROVING WRITE-THROUGHPUT IN A REDUNDANT ARRAY OF MASS STORAGE DEVICES

This is a Continuation of application Ser. No. 08/616,919, filed Mar. 18, 1996, now abandoned, the disclosure of which is incorporated by reference which is a Continuation of application Ser. No. 08/070,615, filed Jun. 1, 1993, now abandoned.

BACKGROUND OF THE INVENTION

The present invention relates to arrayed mass storage devices for computers. More particularly, the resent invention relates to mass storage device arrays in which redundant information is stored on one or more of the devices in the array to permit reconstruction of data stored on another device in the event that other device fails.

The performance of a mass data storage system for a computer or computer network can be, and often is, characterized in several ways. The relative importance of these characterizations typically depends on the particular use to which the storage system is put. One common measure of performance is data availability or fault tolerance. By this measure, the performance of a mass storage system is rated according to its ability to maintain the integrity of, and to provide access to, stored data despite a component failure in the system. Fault tolerance is especially important in applications requiring continuously on-line mass storage. Another common measure of performance is bandwidth—i.e. the rate at which data can be transferred to or from a mass storage file. High bandwidth is especially advantageous in applications involving large data files, such as numerical analysis and image processing. Yet another common measure of performance is transaction rate or request rate. This is a measure of the rate at which the system handles a plurality of successive or simultaneously pending data access requests, and is of particular interest in applications requiring on-line transaction processing, such as an airline reservation system.

Magnetic disk, tape and optical drives are the most widely used media for mass data storage. Historically, as computer processors have become more powerful, there has followed a demand for storage systems with greater mass data storage capacity, to which manufacturers of mass storage systems have responded primarily by making larger capacity (higher storage density) drives. Increasing capacity in this manner, however, does not necessarily increase the performance of the storage system. For example, a failure of the drive can make a larger amount of data inaccessible in a single event. Also, the bandwidth of the drive, a typical bottleneck in large database applications, may still be a problem (even though increased bit density along a track, as well as fixed-head disks with multiple read/write heads, or tracks-in-parallel moving head disks, may be used to reduce transfer time). Further, given a limited number of independent read/write actuators, an increase in disk capacity decreases the density of such independent actuators per unit of stored data. As a result, the increase in capacity may reduce the transaction rate of the drive.

As an alternative to a mass storage system based on a single large disk drive, systems based on an array of smaller disk drives recently have been developed. The array-type design offers potential benefits of high bandwidth, high transaction rate and high fault tolerance. For example, a high bandwidth can be achieved by storing data in stripes across a set of multiple disks and accessing the disks in parallel as though the set of disks were a single logical unit (referred to herein as parallel mode processing).

A high transaction rate can be achieved, especially in applications where data accesses are typically small, by arranging data on the disks of the array such that less than all disks must be accessed to handle a single request. This arrangement is referred to herein as transaction mode processing. Where separate transaction mode requests do not compete for access to the same drive, they can be handled simultaneously, thus allowing a higher transaction rate.

Fault tolerance can be provided by duplicating stored data on a second set of disks; this technique, however, commonly known as mirroring the data, is expensive because it requires full redundancy. A more cost effective approach to providing reliability is to encode the redundant information (also called redundancy information herein) using an error detecting and correcting code such as a Reed-Solomon code, thereby reducing the amount of redundancy information that must be stored. This approach generally involves dividing data to be stored into data words each comprising a plurality of blocks of common size (e.g. four or eight bits). The data blocks are used as coefficients in one or more equations established by the particular error detecting and correcting code being implemented to transform each data word into one or more redundancy terms. The redundancy term (or terms) and the data blocks from which it is derived form a code word which is stored in the array such that each data block and each redundancy term of the code word is stored on a different disk. If a disk fails, each data block or redundant term stored on that disk is regenerated by retrieving the other data blocks and redundancy term(s) of its code word from other disks and transforming them into the missing term using error location and correction equations in accordance with the particular code employed.

Various implementations of fault tolerant arrays based on such encoding schemes have been suggested in the prior art. In one such implementation, the redundancy information for all data in the array is stored on a designated "check" disk. The performance of this implementation is limited because of access contention for the check disk during write operations. More particularly, the redundancy terms stored on the check disk must be updated any time any data in the array is changed. This means that for each write operation to any disk in the array, the check disk becomes busy with a "read-modify-write" operation: the redundancy terms corresponding to the old data are first read from the check disk into a buffer, modified based on the new data, and then written back to the check disk. The read-modify-write performed on the check disk is time consuming. It causes write operations to interfere with each other, even for small data accesses, and thus prevents simultaneous write operations in transaction processing applications.

To reduce the contention problem on write operations, redundancy terms can be distributed across all disks of the array, such that it may be possible in certain circumstances to perform two or more write operations simultaneously. However, contentions for access to redundancy information continue to limit the write-throughput of the system. This is especially disadvantageous in arrays in which multiple redundancy terms are generated for each code word, since each write operation then requires read-modify-write operations on at least three disks (one for the data and at least two for the redundancy terms). This is a costly overhead, particularly in an array with relatively few drives, as it reduces the probability that two or more write operations can be performed simultaneously.

It would be advantageous to be able to eliminate the requirement that a read-modify-write disk access operation be performed on redundancy information each time a transaction mode processing write operation is performed on data in the array. This would allow greater write-throughput by reducing redundancy information contentions, and also would be especially beneficial in applications in which numerous accesses to a localized area of the array (i.e. a "hot-spot"), must be processed at a high rate. An example of such an application is an airline reservation system, in which a single data file storing the reservation information for a given airline flight may become extremely active shortly before the flight. This burst of activity can generate a backlog of write requests to that one file, each of which, in a conventional redundant array, would require a read-modify-write disk access operation on the redundancy information for the file.

Applicants believe that the above advantage can be achieved by caching redundancy information. It is known in the computer arts that data can be cached to increase average memory access times. For example, caching of instructions is used in conventional microprocessor architectures to increase the speed of the microprocessor. For this purpose, a high-speed volatile memory such as a solid-state memory is provided. It is also known that caching may improve data access speed in disk drives. Disk cache memory capable of holding a track of data has been incorporated into disk drive units to eliminate seek and rotation delays for successive accesses to data on a single track. These and other cache memory techniques are well-known, and have been implemented in various data processing system architectures to provide an economical performance boost. However, applicants believe that known prior art applications of cache memory do not provide for the caching of redundancy information in a redundant array, and otherwise do not adequately address the performance limitation on transaction mode processing imposed by conflicting demands for access to redundancy information stored on mass storage devices in a redundant array.

SUMMARY OF THE INVENTION

It is therefore an object of the present invention to improve the write-throughput of a redundant array of mass storage devices by eliminating the requirement that a read-modify-write operation be performed on redundancy information stored on a mass storage device in the redundant array each time a transaction mode write operation is performed on data in the array.

It is also an object of the present invention to provide a new technique for applying cache memory principles to a redundant array so as to mitigate the above-described contention-based performance limitation on write-throughput.

These and other objects and advantages of the resent invention are accomplished by providing a redundant array of mass storage devices in which redundant terms generated when data is written to one or more storage devices in the array are stored in a cache memory. The cache memory improves the write-throughput performance of the array by eliminating the need to perform a read-modify-write operation on redundancy information stored on a mass storage device each time data is written to the array. Using the cache memory, a write operation can be performed by accessing only the mass storage device or devices in the array on which the data to be modified is stored. The number of access cycles used in a write operation is thereby reduced, and write-throughput of the system, particularly at peak demand periods, is improved.

BRIEF DESCRIPTION OF THE DRAWING

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The preferred embodiments of the present invention described herein comprise a system for mass data storage. In such embodiments, the preferred devices for storing data are hard disk drives (referred to hereinafter simply as disk drives). As will be appreciated by a person of skill in the art, other types of mass storage devices (e.g., tape drives or optical drives) may be substituted for the disk drives described herein and such embodiments are within the scope of the present invention.

In U.S. Pat. Nos. 5,140,592 ("the '592 patent") and 5,134,619 ("the '619 patent"), a disk array system is disclosed which is well-suited for illustrating preferred embodiments of the present invention, and it is in the context of this disk array system that the preferred embodiments of the present invention will be described. FIGS. 1–4 of the present application and the accompanying text provide background information concerning the disk array system of the '592 and '619 patents, and FIGS. 5–9 and the accompanying text provide various modifications to the disk array system in accordance with principles of the present invention. Additional details concerning the structure and operation of the disk array system are available from the '592 and '619 patents, the disclosures of which are incorporated herein by reference.

Figure 1:
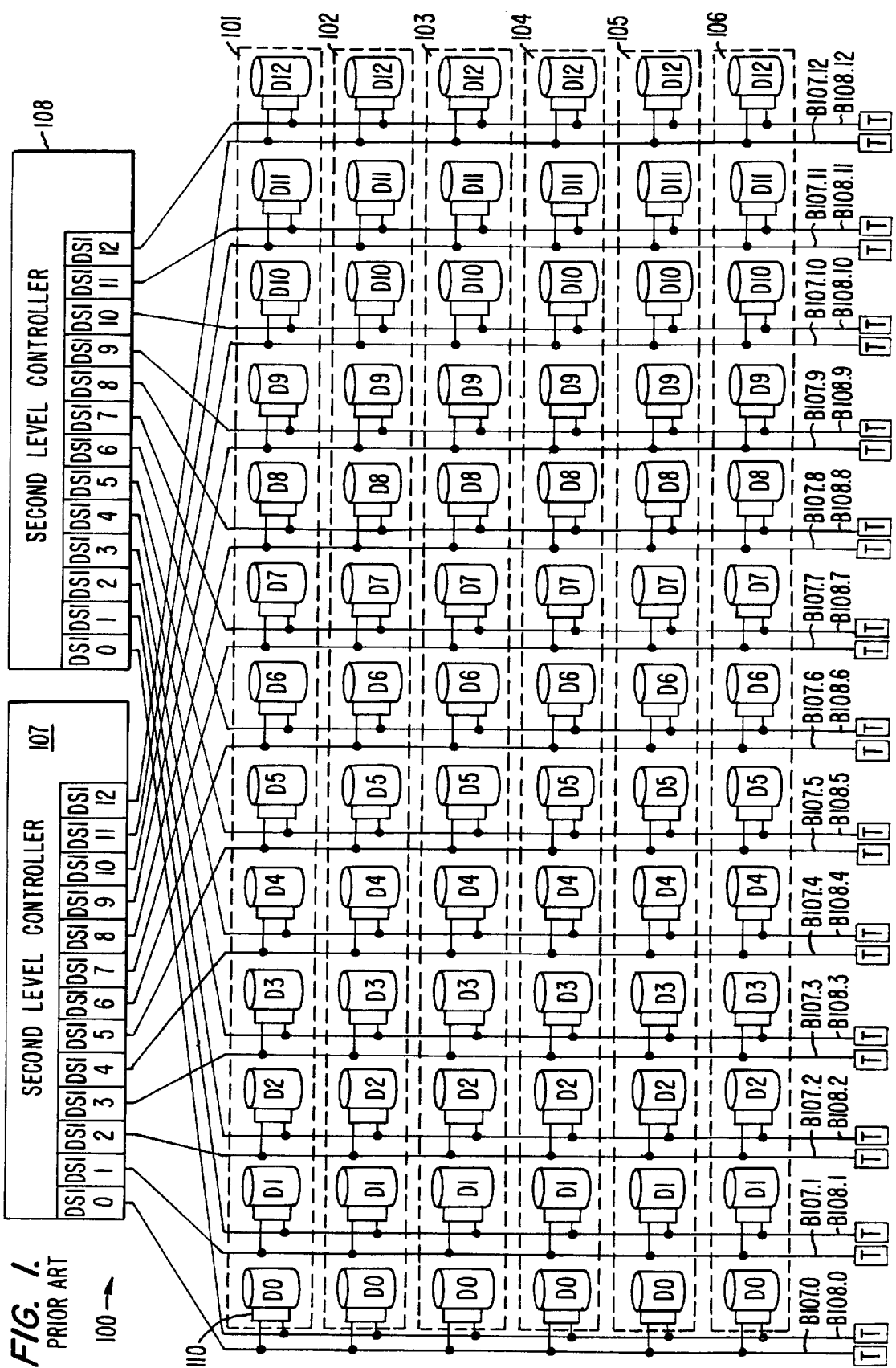
FIG. 1 illustrates an embodiment of a multiple device disk drive array coupled to two controller units.

FIG. 1 illustrates a disk array system 100 including a plurality of disk drive sets 101–106. As shown, each disk drive set comprises a row of thirteen disk drives D0–D12. System 100 also includes two controllers 107 and 108. Each controller has a set of thirteen data interfaces DSI.0–DSI.12 by which it communicates with disk drives of system 100. Each data interface is implemented in accordance with the initial Small Computer System Interface (SCSI-1) standard promulgated by the American National Standard for Information Systems (ANSI). The thirteen data interfaces of controller 107 connect controller 107 to thirteen corresponding SCSI-1 I/O buses B107.0–B107.12.

Likewise, the thirteen data interfaces of controller 108 connect controller 108 to thirteen corresponding SCSI-1 I/O buses B108.0–B108.12. In accordance with the SCSI-1 standard, each I/O bus has a terminator, which is labelled "T" in the figures.

Each disk drive in sets 101–106 has an associated switch 110 by which the data port of the disk drive is connected to either an I/O bus from controller 107 or an I/O bus from controller 108. For example, D0 disk drives (i.e. the disk drives in the leftmost column of FIG. 1) can be individually connected by their associated switches to either bus B107.0 from controller 107 or the B108.0 bus from controller 108. Similarly, the six D1 drives can be individually connected by their associated switches to either of buses B107.1 and B108.1, and so on for drives D2–D12.

Controllers 107 and 108 are preferably configured such that each controller is primarily responsible for different ones of disk drive sets 101–106. In other words, during normal operation of system 100 some of disk drive sets 101–106 will be controlled by controller 107 and others will be controlled by controller 108. Each controller is also secondarily responsible for the disk drives controlled by the other controller, such that, in the event one controller fails the other controller takes control of the remaining drives. For example, controller 107 may be primarily responsible for disk drive sets 101–103 and secondarily responsible for disk drive sets 104–106, with controller 108 being primarily responsible for disk drive sets 104–106 and secondarily responsible for sets 101–103. This means that the disk drives in drive sets 101–103 would be ordinarily connected to I/O buses of controller 107 by their associated switches 110, and that the disk drives of sets 104–106 would be ordinarily connected to the I/O buses of controller 108 by their associated switches. In the event of a failure of either controller 107 or 108, the other controller signals the switches associated with the disk drives previously under control of the failed controller to connect the drives to the buses under its control, thus providing fault tolerance.

Figure 3:
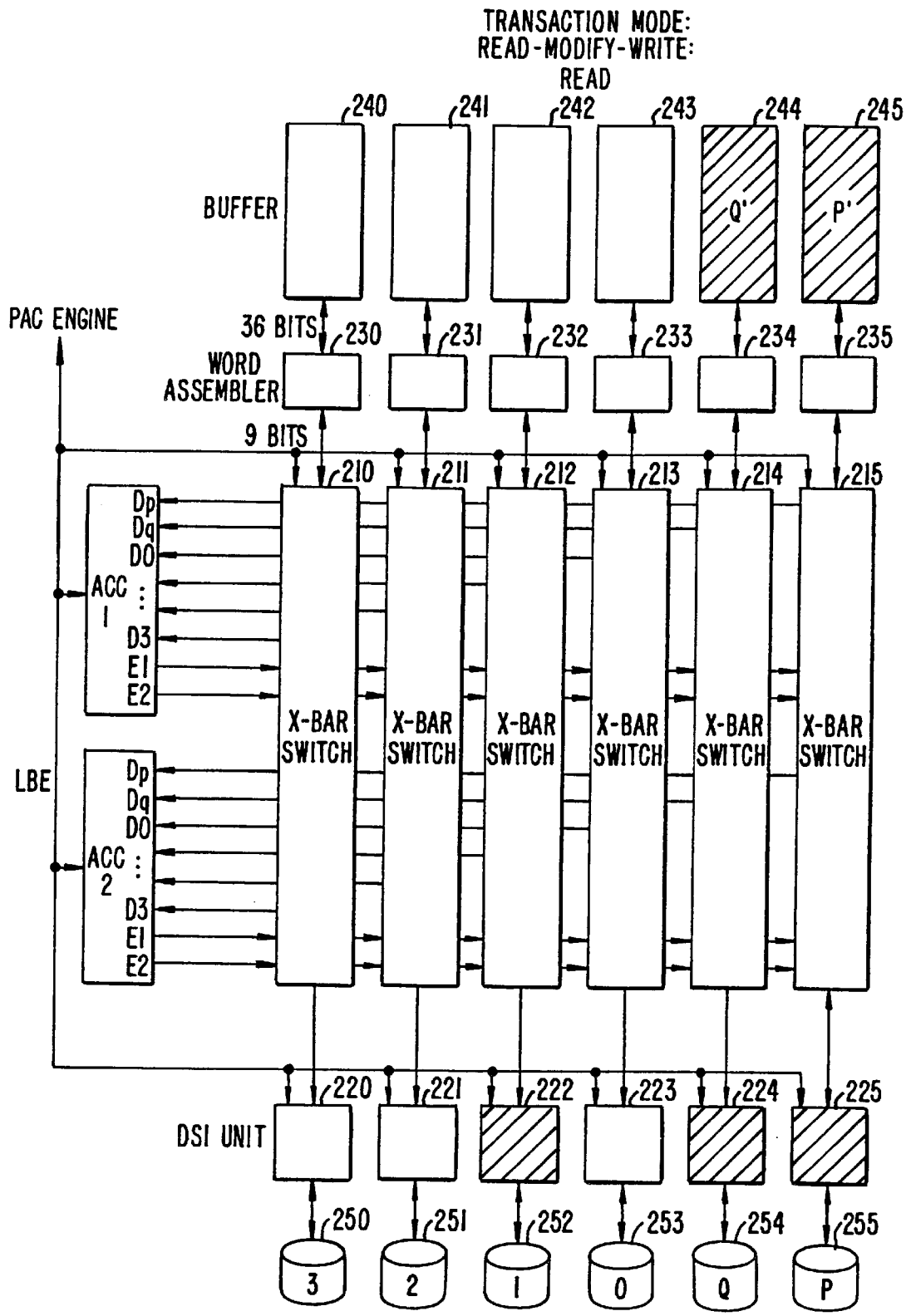
FIGS. 3 and 4 show, respectively, the data flow through the circuitry of FIG. 2 during the read and write cycles of a Transaction Mode Read-Modify-Write Operation.

Controllers 107 and 108 respectively form the second levels of a pair of two-level control devices which together comprise a system controller for disk array system 100 (see, e.g., FIG. 3 of the '592 patent). Associated with each of second level controllers 107 and 108 is a first level controller which connects the second level controller to one or more computers. The two-level control devices are cross-connected such that if either device experiences a failure in its first or second level controller, the corresponding first or second level controller in the other two-level device can be used to route communications and data between the computers and disk drive sets 101–106.

In a typical configuration of system 100, the thirteen disk drives of each disk drive set are used as follows: 10 disk drives store application data, 2 disk drives ("check disks") store redundancy information for the application data on the 10 disk drives, and one drive is a spare for use in the event another disk drive in the set fails. The configuration of each set is flexible, including the distribution of redundancy information. For example, rather than storing redundancy information exclusively on designated check disks, the redundancy information can be distributed among the application data stored in the set by striping redundancy terms through the disk drives.

System 100 operates primarily in one of two modes. These are parallel data storage operations and transaction processing operations. In parallel processing operations, a plurality of disk drives in a disk drive set operate as a single mass storage device, such that each of the disk drives within this plurality receive or transmit data simultaneously. In transaction processing operations, divided portions of the set may be accessed independently.

The flexible configurability and different operating modes of system 100 allow for the system to accommodate applications having different bandwidth and transaction rate requirements, while providing high reliability (fault tolerance), as is set forth more fully in the '592 and '619 patents. Fault tolerance in system 100 is in part achieved through switching circuitry and error detection and correction circuitry in controllers 107 and 108. This circuitry includes, for each DSI unit of the controller, a corresponding buffer memory coupled to the DSI unit by a configurable multiplexer circuit called a cross-bar switch (also referred to herein as a "X-bar" switch). The buffer memories are also coupled to a first level controller, and act as an interface between data paths in the first and second level controllers. The cross-bar switches are interconnected and can be configured to couple data between any DSI unit and any buffer memory, such that data can be routed around failed buffer memories or away from failed disk drives.

In addition, the circuitry incorporates Array Correction Circuits ("ACCs") which can be connected to all of the buffer memory/disk drive data paths by the cross-bar switches to provide error detection and correction nearly simultaneously with the transfer of data between the buffer memories and the disk drives. As data is written to a disk drive set, the ACC's calculate redundancy terms for that data and provide the terms to the cross-bar switches for storage in the disk drive set. The ACC's can detect and correct errors across an entire group or array of disk drives simultaneously. On subsequent read operations, the ACC compares the data read with the stored redundancy terms to determine if the data is error-free.

The X-bar switches have several internal registers. As data is transmitted to and from the data disk drives, it must go through an X-bar switch. Within the X-bar switch the data can be clocked from one register to the next before going to the buffer memory or the disk drive. The time it takes to clock the data through the X-bar internal registers is sufficient to allow the ACC to calculate and perform its error correction tasks. During a write operation, this arrangement allows the redundancy terms to be generated and written to their designated disk drives at the same time as the data is written to its disk drives, the operations occurring in parallel. In effect the X-bar switches establish a data pipeline of several stages, the plurality of stages effectively providing a time delay circuit.

Figure 2:
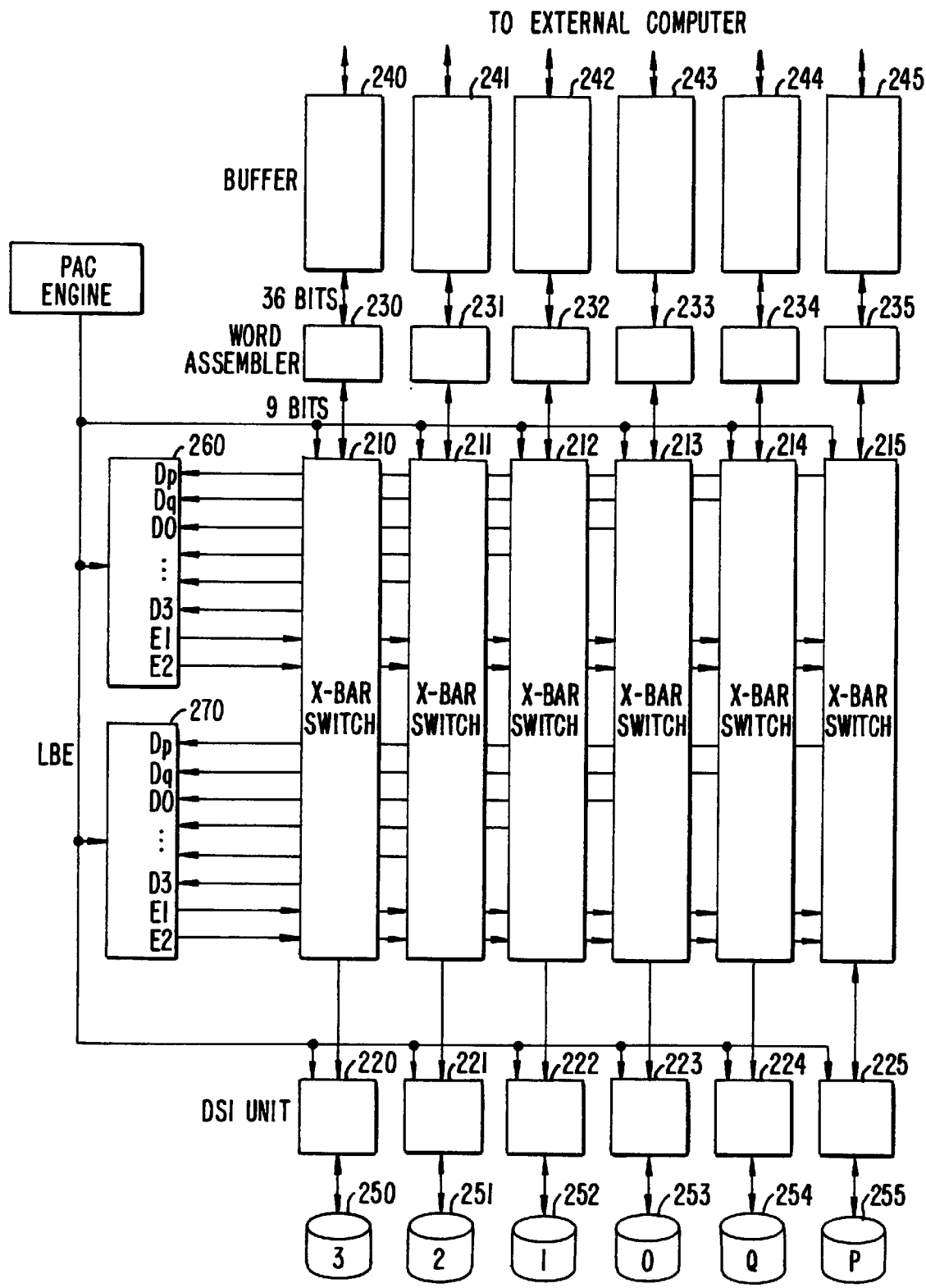
FIG. 2 is a block diagram showing switching circuitry and error check and correction circuitry of the controller units of FIG. 1.

FIG. 2 shows an embodiment 200 of the above-described switching circuitry and error detection and correction circuitry of second level controllers 107 and 108 (shown for one controller only). In FIG. 2, "PAC engine" refers to a microprocessor which controls the illustrated circuitry, as well as other circuitry of the second level controller. Bus LBE as illustrated in FIG. 2 does not actually couple the PAC engine directly to the X-bar switches, the ACCS, and the DSI units. Instead, the PAC engine communicates with various sets of registers assigned to the X-bar switches, the ACCs and the DSI units. These registers are loaded by the PAC engine with the configuration data which establishes the operating modes of the aforementioned components.

FIG. 2 shows data disk drives 250 through 253 and P and Q redundancy term disk drives 254 and 255. ("P and Q" refer respectively to two different redundancy terms generated by the ACC's pursuant to a Reed-Solomon code implemented in disk array system 100. The '592 and '619 patents describe the equations by which these terms are generated from data terms of a codeword.) Each disk drive is coupled by a bi-directional SCSI-1 bus to DSI units 220 through 225. The DSI units' perform some error detecting functions as well as buffering data flow into and out of the disk drives. Each DSI unit is in turn coupled by a bi-directional bus means to an X-bar switch, the X-bar switches herein numbered 210 through 215. The X-bar switches are coupled in turn to word assemblers 230 through 235 by means of a bi-directional bus. The bus width in this embodiment is 9 bits, 8 for data, 1 for a parity bit. The word assemblers assemble 36-bit words for transmission to buffer memories 240 through 245 over bi-directional buses having a 36-bit width. When data flows from the buffer memories to the X-bar switches, the word assemblers decompose the 36-bit words into 9-bit blocks of data and parity. The X-bar switches are also coupled to ACC units 260 and 270. (The interconnection between the X-bar switches and the ACC's is shown in more detail in FIG. 6 of the '619 patent and FIG. 11 of the '592 patent.) Each X-bar switch can send to both or either ACC the 8 bits of data and 1 parity bit that the X-bar switch receives from either the DSI units or the word assemblers. In turn, the X-bar switches can receive 9 bits of the P and Q redundancy terms calculated by the ACC's over lines E1 and E2. As shown, the ACC's can direct P and Q redundancy terms to any X-bar switch, not being limited to the disk drives labelled P and Q. Depending on the configuration commanded by the PAC engine, ACC's 260 and 270 can be mutually redundant, in which case the failure of one or the other ACC does not affect the system's ability to detect or correct errors, or each ACC can detect and correct errors on a portion of the total array of disk drives. When operating in this second manner, certain specific types of operations which write data to individual disk drives are expedited, as each ACC can write to a separate individual disk drive. The specific disk drives that the individual ACC's monitor can be reconfigured at any time by the PAC engine. The illustrated connections of the ACC's and the X-bar switches also allow data to be switched from any X-bar switch to any other, once the PAC engine configures the related registers. This flexibility allows data to be routed away from any failed disk drive or output buffer.

Each ACC unit comprises a redundancy circuit, wherein P and Q redundancy terms are generated, P and Q registers, wherein the P and Q redundancy terms are stored temporarily, a regenerator and corrector circuit, wherein the data from or to a failed disk drive output or buffer can be regenerated or corrected, and output interfaces.

Each X-bar switch is composed of two mirror-image sections. These sections comprise, respectively, 9-bit registers, multiplexers and input/output interfaces. In operation, data can flow either from the word assembler to the DSI unit or vice versa, but simultaneous two-way traffic is not permitted. Although many pathways through the X-bar switch are possible, two aspects of these pathways are of particular importance.

First, in order to allow the ACC sufficient time to calculate P and Q redundancy terms or to detect and correct errors, a data pathway of several registers can be used, the data requiring one clock cycle to move from one register to the next. By clocking the data through several registers, a delay of sufficient length can be achieved. For example, assuming a data flow from the word assembler unit to a disk drive, 9 bits are clocked into each of a first pair of 9-bit registers on the first clock pulse (so that each register receives the same 9 bits). On the next clock pulse, the data from one of the first pair of registers moves to a second 9-bit register while the data from the other register of the first pair moves through a redundancy circuit in the ACC. At the same time, data from other X-bar switches typically moves through the redundancy circuit in the same ACC, and the redundancy circuit generates P and Q redundancy terms which are clocked into the P and Q registers, respectively. The next clock pulses move the data to the DSI unit (and clocks out the P and Q terms to other DSI units).

The second important aspect of the internal pathways is that data may flow only from the DSI unit to the ACC or from the word assembler to the ACC, but not from both to the ACC simultaneously. This is accomplished through the use of tri-state registers. (For an illustration of an embodiment of the above-described internal circuits of the ACC and X-bar switches, see FIG. 6 of the '619 patent or FIG. 11 of the '592 patent)

Although, for purposes of clarity, switching circuitry for only six drives is illustrated in FIG. 2, the illustrated architecture is easily extended to a larger number of drives (such as, e.g., the thirteen drives D0–D12 of FIG. 1) by increasing the number of cross-bar switches and buffers in a like manner and maintaining the interconnected bus structures illustrated in FIG. 2.

The main functional components of FIGS. 1 and 2 and their physical connections to one another have now been described. The various modes of operation of disk array system 100, which were previously mentioned, will now be described in greater detail to provide a better understanding of the background of the present invention. At this point the reader may wish to refer to the discussion in the '592 and '619 patents of Redundancy Generation and Error Checking Equations, which provides additional information concerning the Reed-Solomon code implemented by system 100.

Parallel Processing Operations

In parallel processing operations, all the drives of a disk drive set (or at least a plurality of the drives of the set) are considered to comprise a single large array. Assuming that the array is to be comprised of n data disk drives and P and Q disk drives operated in parallel, each of the n+2 disk drives will either receive or transmit 9 bits of data simultaneously. The result of this is that the 9-bit blocks of data appearing in the DSI units of all the n+2 drives simultaneously are treated as one large code word. (See, e.g., FIG. 8A of the '619 patent or FIG. 13A of the '592 patent). The code word comprises 9 bits of data from or for data disk drive $d_{n-1}$, 9 bits of data from or for data disk drive $d_{n-2}$, and so on, with the P and Q disk drives receiving or transmitting the P and Q redundancy terms. In a parallel write operation, all the disk drives in the array, except for the spare disk drive, will receive a block of data (or a redundancy term whose length is equal to the data block) simultaneously. The same sector in all the disk drives will receive a part of the code word. For example, in the illustration of the '619 and '592 patents, sector 1 of disk drive n–1 will receive a block of data designated $d_{n-1}$ from the code word, sector 1 of disk drive n–2 will receive a block of data designated $d_{n-2}$ from the code word and so on.

The code words are preferably "striped" across the various disk drives. This means that for each successive code word, different disk drives receive the P and Q redundancy terms. In other words, drive $d_{n-1}$ is treated as drive $d_{n-2}$ for the second codeword and so on, until what was originally drive $d_{n-1}$ receives a Q redundancy term. Thus, the redundancy terms "stripe" through the disk drives.

Referring back to FIG. 2, for a parallel data write to the disks, the data is provided in parallel from buffers 240, 241, 242 and 243 along the data buses coupling the buffers to X-bar switches 210, 211, 212, and 213 after the 36-bit data blocks are disassembled in word assemblers 230 through 233 into 9-bit blocks. These X-bar switches are also coupled to inputs D3, D2, D1 and D0, respectively, of ACC 260 and ACC 270. In parallel processing modes, the two ACCs act as mutual "backups" to one another. Should one fail, the other will still perform the necessary error correcting functions. In addition to operating in a purely "backup" condition, the PAC engine can configure the ACCs so that each ACC is performing the error detection and correction functions for a portion of the array, the other ACC performing these functions for the remaining disk drives in the array. As the ACC units are still coupled to all the disk drives, failure of one or the other unit does not impact the system as the operating ACC can be reconfigured to act as the dedicated ACC unit for the entire array. For purposes of discussion, it is assumed here that ACC 260 is operating. ACC 260 will calculate the P and Q redundancy term for the data in the X-bar switches and provide the terms to its E1 and E2 outputs, which outputs are coupled to all the X-bar switches. For discussion only, it is assumed that only the E2 connection of X-bar switch 214 and the E1 connection of X-bar switch 215 are enabled. Thus, although the data is provided along the buses coupling ACC 260's E1 and E2 output to all the X-bar switches, the Q term is received only by X-bar switch 214 and the P term is received by X-bar switch 215. From thence the P and Q terms are provided first to DSI units 224 and 225 and then disk drives 254 and 255. It should be recalled that the various internal registers in the X-bar switches will act as a multi-stage pipeline, effectively slowing the transit of data through the switches sufficiently to allow ACC 260 to calculate the P and Q redundancy terms.

Since ACC 270 is coupled to the X-bar switches in a substantially identical manner to ACC 260, the operation of the system when ACC 270 is operational is essentially identical to that described for ACC 260.

Subsequent parallel reads from the disks occur in the following manner. Data is provided on bi-directional buses to DSI units 220, 221, 222 and 223. P and Q redundancy terms are provided by DSI units 225 and 224, respectively. As the data and P and Q terms are being transferred through X-bar switches 210 through 215, ACC 260 uses the P and Q terms to determine if the data being received from the disk drives is correct. Word assemblers 230 through 233 assemble successive 9-bit blocks until a 36-bit word is available. This 36-bit word is forwarded to buffers 240 through 243. Note that the 9-bit blocks are transmitted to the buffers in parallel. If that data is incorrect, the PAC engine will be informed.

During a parallel read operation, in the event that there is a failure of a disk drive, the failed disk drive will, in certain instances, communicate to the PAC engine that it has failed. The disk drive will communicate with the PAC engine if the disk drive cannot correct the error using its own corrector. The PAC engine will then communicate with ACC's 260 and 270 by loading the failed drive registers in the ACC (not shown in the figures) with the address of the failed drive. The failed drive can be removed from the array by deleting its address from the configuration registers. One of the array's spare drives can then be used in place of the failed drive by inserting the address of the spare drive into the configuration registers.

The ACC will then calculate the replacement data necessary to rewrite all the information that was on the failed disk onto the newly activated spare. As used herein, the term spare drive indicates a disk drive which ordinarily does not receive or transmit data until another disk drive in the system has failed.

When the data, P, and Q bytes are received, the ACC circuits use the failed drive location in the failed drive registers to calculate replacement data for the failed drive. After the calculation is complete, the data bytes, including the recovered data, are sent to data buffers in parallel. The number of failed drives that can be tolerated depends on the particular Reed-Solomon code implemented. All operations to replace failed disk drives and the data thereon occur when the system is operating in a parallel mode.

Regeneration of data occurs under PAC engine control. When a failed disk drive is to be replaced, the ACC regenerates all the data for the replacement disk. Read/write operations are required until all the data has been replaced. The regeneration of the disk takes a substantial amount of time, as the process occurs in the background of the system's operations so as to reduce the impact to normal data transfer functions. (See Tables 3 and 4 of the '619 and '592 patents and the accompanying text for a further discussion of actions taken following failure of a drive).

Transaction Processing Mode: Read

As previously mentioned, transaction processing applications require the ability to access each disk drive independently. Although each disk drive is independent, the ACC code word with P and Q redundancy is maintained across the array in the previously described manner (with the exception that, as discussed below, if striping is used the P and Q redundancy terms preferably are striped in sectors or other stripe depths greater than a single code word). For a normal read operation, the ACC circuitry is not generally needed. If only a single drive is read, the ACC cannot do its calculations since it needs the data from the other drives to assemble the entire code word to recalculate P and Q and compare it to the stored P and Q. Thus, the data is assumed to be valid and is read without using the ACC circuitry. (See FIG. 10 of the '619 patent or FIG. 16 of the '592 patent). Where drive 252 is the one selected, the data is simply passed through DS1 unit 222 X-bar switch 212, word assembler 232 and buffer 242 to the external computer. If the disk drive has failed, the read operation is the same as a failed drive read in parallel mode with the exception that only the replacement data generated by the ACC is sent to the data buffer. In this case, the disk drive must notify the PAC engine that it has failed, or the PAC engine must otherwise detect the failure. Otherwise, the PAC engine will not know that it should read all the drives, unless it assumes that there might be an error in the data read from the desired drive. (A failed drive read is illustrated, for example, in FIG. 11 of the '619 patent, with drive 252 having the desired data, as in the example of FIG. 10. In FIG. 11, the PAC engine knows that drive 252 has failed, so the PAC engine calls for a read of all drives, with the drive 252 data being reconstructed from the data on the other drives and the P and Q terms. Only the reconstructed data is provided to its buffer, buffer 242, since this is the only data the external computer needs.)

In transaction mode processing, it is desirable that the data comprising a particular data file, which may, for example, equate to the size of a disk sector, not be striped over multiple disk drives. By keeping the data file on a single disk drive, the number of drives that must be accessed to read that file is minimized. Likewise, for purposes of write operations (discussed below), it is desirable that the P and Q redundancy terms corresponding to the data of a particular data file not be striped over multiple disks. Therefore it is preferable that code words, if they are striped at all, be striped in groups wherein the depth of each stripe is sufficiently large to allow an entire data file to be stored on a single disk drive and the P and Q redundancy terms corresponding to that data file to be stored on single P and Q disk drives respectively. Such a stripe may, for example, have a depth which equates to a disk sector. Thus, instead of changing the distribution of data blocks and P and Q redundancy terms for each successive code word as previously described for the parallel processing mode (such that, e.g., after drive $d_{n-1}$ receives data block n−1 of code word 1 it is treated as drive $d_{n-2}$ for code word 2, and as drive $d_{n-3}$ for code word 3, etc.), all of the code words within a row of sectors across the array would be distributed in the same manner (such that, e.g., sector 1 of drive $d_{n-1}$ would contain the data block n−1 for each code word stored in the first row of sectors of the array).

Transaction Processing Mode: Write

When any individual drive is written to, the P and Q redundancy terms must also be changed to accommodate the new data. This is because the data being written over was part of a code word extending over multiple disk drives and having P and Q terms on two disk drives. The previously stored P and Q terms will no longer be valid when part of the code word is changed, so new P and Q terms, P" and Q", must be calculated and written over the old P and Q terms on their respective disk drives. P" and Q" will then be proper redundancy terms for the modified code word. One possible way to calculate P" and Q" is to read out the whole code word and store it in the buffers. Assuming drive 252 is to receive new data, the new portion of the code word for drive 252 can then be supplied to the ACC circuit along with the rest of the codeword, and the new P" and Q" can be calculated and stored on their disk drives as for a normal parallel write. However, if this method is used, it is not possible to simultaneously do another transaction mode access of a separate disk drive (i.e., drive 250) having part of the code word, since that drive (250) and its buffer (240) are needed for the transaction mode write for the first drive (252).

Two simultaneous transaction mode accesses are made possible by using only the old data to be written over and the old P and Q to calculate the new P" and Q" for the new data. This is done by calculating an intermediate P' and Q' from the old data and old P and Q, and then using P' and Q' with the new data to calculate the new P" and Q". This requires a read-modify-write operation on the P and Q drives. The equations for the new P and Q redundancy is:

New P redundancy (P")=(old P−old data)+new data

New Q redundancy (Q")=(old Q−old data×$a_j$)+new data×$a_j$,

P'=old P−old data

Q'=old Q−old data×$a_j$, where $a_j$ represents constants determined by the Reed-Solomon code.

Figure 4:
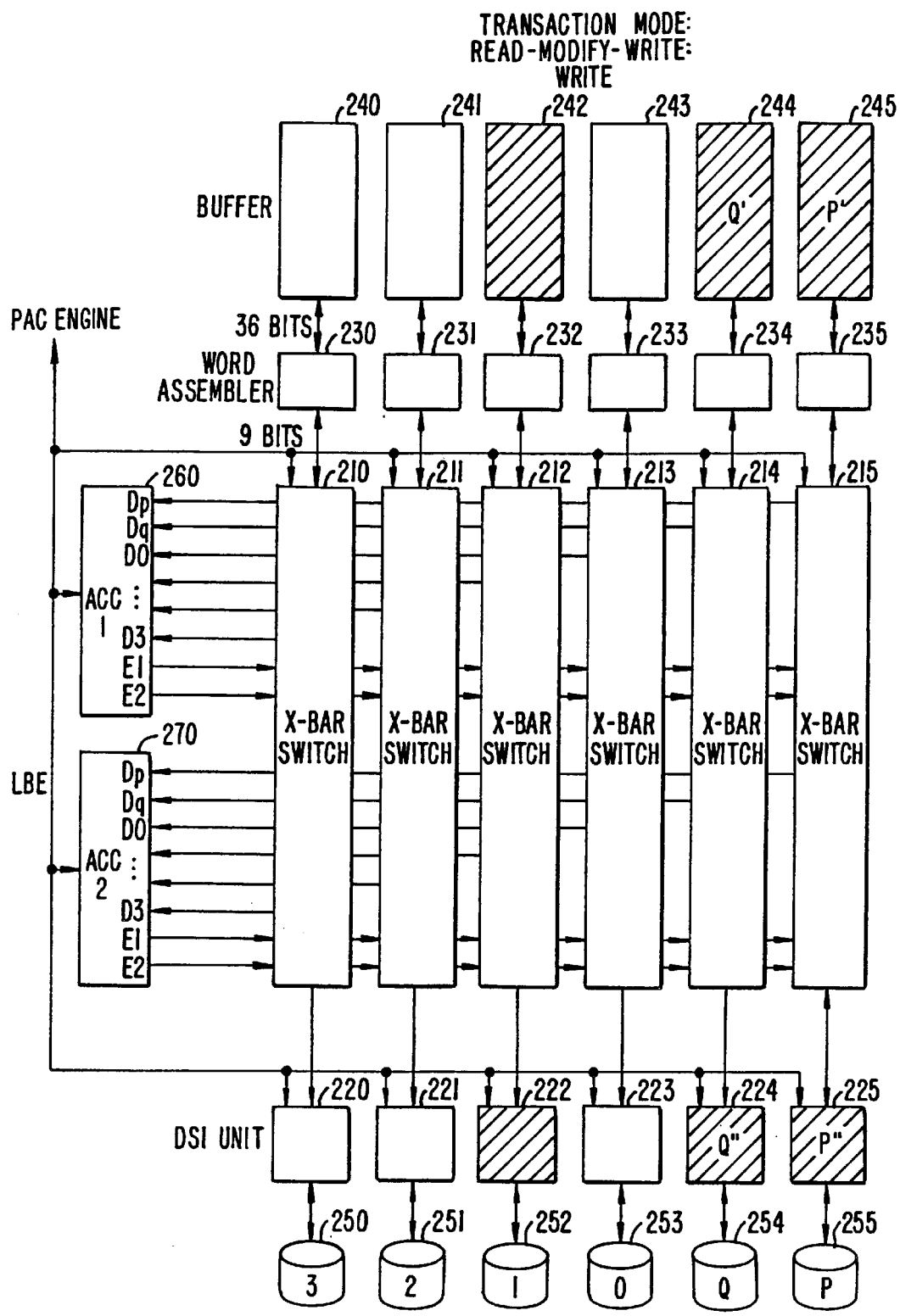

During the read portion of the read-modify-write, the data from the drive to be written to and the P and Q drives are summed by the ACC logic. This summing operation produces the P' and Q' data, which is sent to a data buffer as shown in FIG. 3. When the new data is in a data buffer, the write portion of the cycle begins. During this portion of the cycle, the new data and the P' and Q' data are summed by the ACC logic to generate the new P" and Q" redundancy. When the summing operation is complete, the new data is sent to the disk drive and the redundancy information is sent to the P and Q drives, as shown in FIG. 4.

The same operations are performed for a failed disk drive write in transaction processing operations as for parallel data writes, except that data is not written to a failed drive or drives. With respect to transaction processing functions during normal read operations, no action is required from the ACC logic. (See Tables 5 and 6 in the '619 and '592 patents for the actions taken by the ACC logic during failed drive reads in transaction processing mode).

When a failed data disk drive is to be written, all good data disk drives must be read so that a new P and Q redundancy can be generated. All of the data from the good data disk drive and the write data is summed to generate the new redundancy. When two data disk drives fail, the ACC logic must calculate replacement data for both failed drives. If only one drive is to be read, both must be reported to the ACC logic.

During write operations, the ACC continues to calculate P and Q redundancy. (Table 7 of the '619 and '592 patents shows the ACC's tasks during failed drive writes.)

Demand Caching of Redundancy Terms

Using the above-described method of calculating new P" and Q" redundancy terms from only the old data to be written over and the old P and Q, two simultaneous transaction mode write operations can be accomplished in instances where there is no conflicting overlap between the disk drive cycles involved in each transaction. An important factor affecting the probability of overlap is the number of disk drive cycles required by each transaction. In accordance with principles of the present invention, the number of disk drive cycles involved in servicing a typical transaction mode write request is reduced by caching redundancy terms in a memory associated with the disk array system so that the redundancy terms may be updated without requiring a read-modify-write operation. The caching is controlled by the second level controller and is transparent to the external computers to which the disk array system is connected.

The cache memory may be implemented using conventional high-speed solid-state memory devices. In a preferred embodiment, the cache memory is non-volatile so that, in the event of a power failure in the disk array system, the contents of the cache memory are preserved. The size of the cache memory is a design choice, and, as in conventional applications of cache memory, this choice depends on application-specific factors such as cost. However, it should be recognized that a cache memory having substantially less storage capacity than a single disk drive of the array may be used, and that the size of the cache can be independent of the number of disk drives in a particular disk drive set (because the amount of redundancy information in the set may remain constant). These are particular advantages of the present invention, especially when implemented in large arrays. For example, in an array comprising a set of 12 disk drives wherein, for any stripe, 10 of the disks store data, 1 stores redundancy information (e.g., simple parity information) and 1 is a spare, the present invention may effectively increase the amount of disk capacity available for simultaneous transactions by 10/11 of a disk drive while at most caching only 1/11 of the stripe.

The method by which the cache memory is used generally includes the following steps. When P" and Q" redundancy information is generated by the ACC's in the second level controller during a read-modify-write operation, this information is directed to the cache memory by either the ACC's themselves or the PAC engine of the controller. The PAC engine maintains a table in memory (in the cache or in another memory in the controller) in which it records the identity of the cached P" and Q" information (including, for example, the logical or physical addresses in the disk array at which the P" and Q" information normally would be stored). The PAC engine may also, or alternatively, set a flag in a data structure of a configuration database which it maintains to identify any corresponding P and Q information stored on disk as invalid. (See FIG. 25 of the '592 patent and the accompanying text for further disclosure of exemplary embodiments of such data structures).

Upon the occurrence of a subsequent write request involving data covered by the cached P" and Q" information, the PAC engine determines from its records that the write request involves cached redundancy information and it causes the appropriate redundancy information to be read from the cache for summing with the data to be written over (to thereby generate the intermediate P' and Q' information). When the resulting P' and Q' information is summed with the new data, the resulting new P" and Q" information is written back to the cache memory (where it may, although not necessarily, be written over the previous P" and Q" information).

At convenient times (i.e. when disk cycles are available and their use would not degrade system performance), or if the cache memory becomes full, the PAC engine transfers cached P and Q information that has not been recently or frequently updated to the appropriate disk drives. The PAC engine may perform this transfer operation as a background task. The particular conditions under which data from the cache memory is purged are application specific and, like cache size, can be chosen as desired to achieve performance/cost optimization. If the cache fails during operation, the PAC engine may recreate the cached redundancy information by reading the data from the disk drives which was covered by the cached redundancy information (i.e. the data which together with the cached information comprised code words) and pass the data through an ACC.

There are several optional ways in which the caching method of the present invention may be implemented, including, if desired, the caching of new data along with its corresponding P" and Q" redundancy terms. Following is a list of exemplary alternatives which may be implemented in accordance with principles of the present invention when new data is presented to the disk array system as a replacement for old data:

1. If the old data and its corresponding P and Q terms are stored in disk drives, then: read the stored data and P and Q terms from the disk drives; generate P" and Q" terms for the new data; write both the new data and the P" and Q" terms to cache; and set flags in controller memory indicating the old data and P and Q terms still stored on disk are invalid and that the new data and P" and Q" therms are in cache.
2. If the old data is stored on a disk drive and its corresponding P and Q terms are in the cache memory, then: read the data from the disk and the P and Q from the cache; set a flag in controller memory indicating that the old data on the disk is invalid; generate P" and Q" terms for the new data; and write both the new data and the P" and Q" terms to cache.
3. Follow the same steps as in 1 or 2, but write the new data to disk over the old data and do not set a flag indicating the data is invalid.
4. If the old data and its corresponding P and Q terms are in the cache memory, perform a read, modify and write operation all from the cache memory.
5. If the cache memory is full, write the least used information (data and/or redundancy terms) in the cache memory to the disk drives and the new data and or new redundancy terms to the cache memory.

The above options provide varying reductions in the number of disk cycles required for a read-modify-write operation. For example, assuming that the present invention is to be implemented in a disk array system in which P and Q redundancy terms are stored on different disk drives, such that a normal read-modify-write operation requires 6 disk drive cycles (including 3 disk drive reads [old data, P and Q] and 3 disk drive writes [new data, P" and Q"]), the 6 disk drive cycles can be reduced to 0 if all terms (old data and P and Q) are already in the cache memory. Alternatively, the 6 disk drive cycles can be reduced to 1 if only the old data is read from disk (i.e. the P and Q are already in the cache memory and the new data and P" and Q" terms are written into the cache memory); or 2 if the old data is read from disk and the new data is written back to disk (P and Q being read from, and P" and Q" being written to, cache memory); or 3 if the old data and the P and Q terms are read from disk (new data and P" and Q" being written to cache memory); or 4 if old data and P and Q terms are read from disk and new data is written to disk (P" and Q" being written to the cache memory).

In any case, all transactions in the cache memory, with the exception of multiple transactions, are eventually written to the disk drives as a background task executed by the PAC engine. This typically does not degrade performance because disk cycles are critical only during certain peak periods.

Figure 8A:
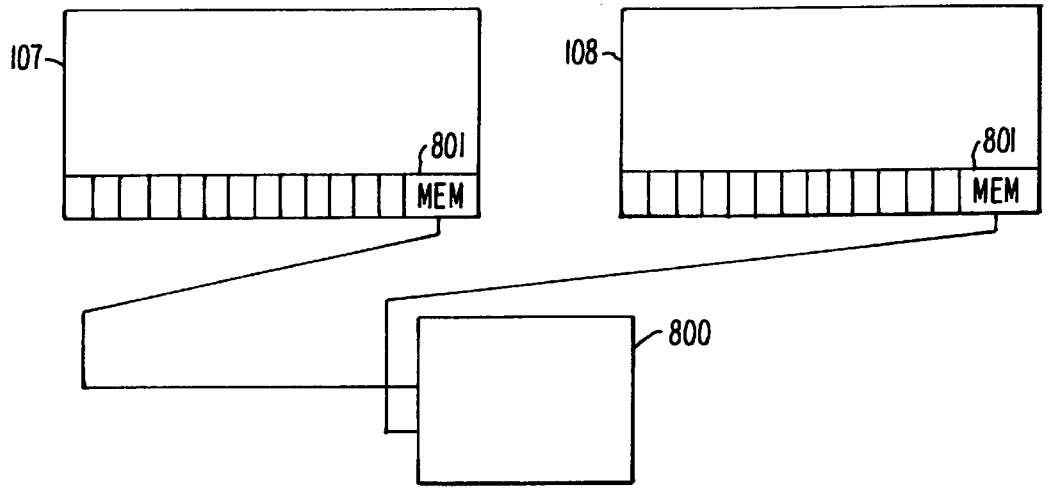
Figure 8B:
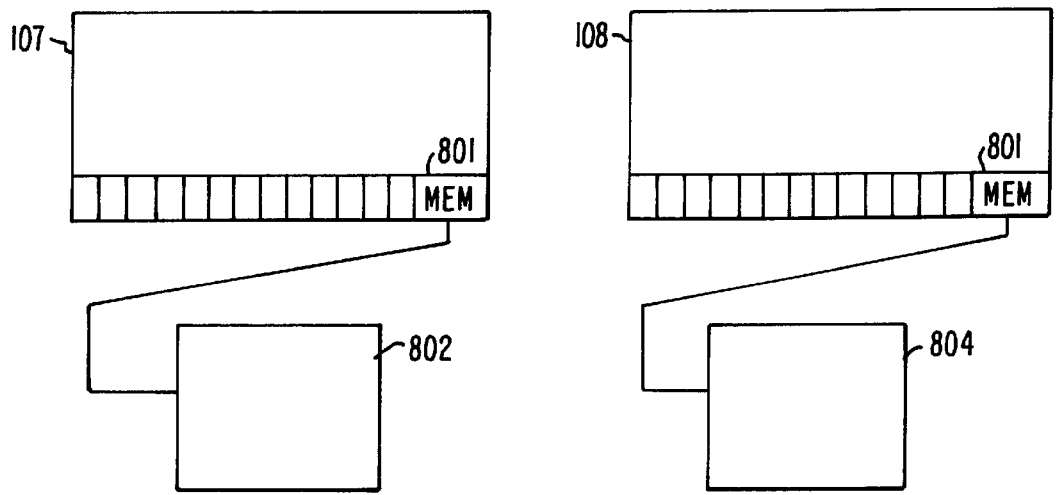
Figure 8C:
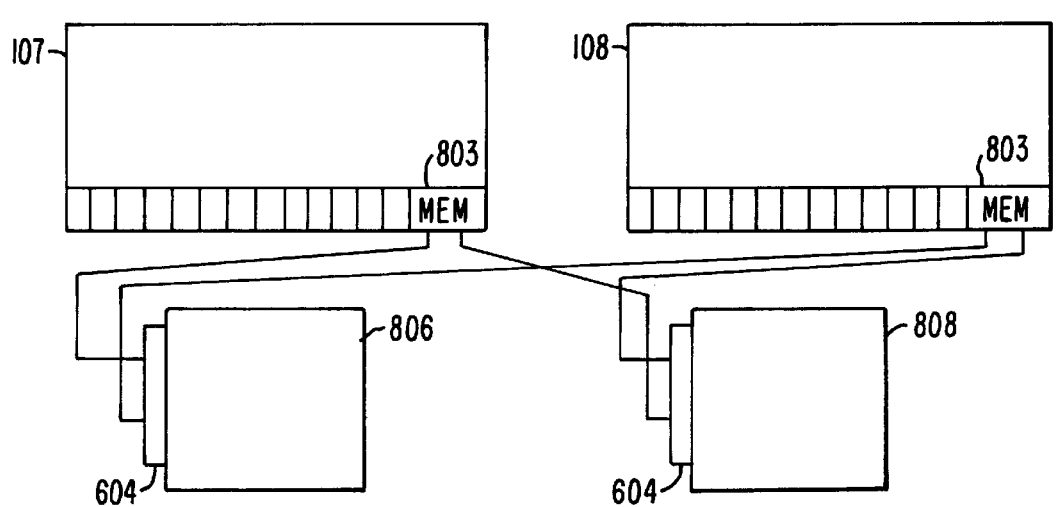
Figure 9:
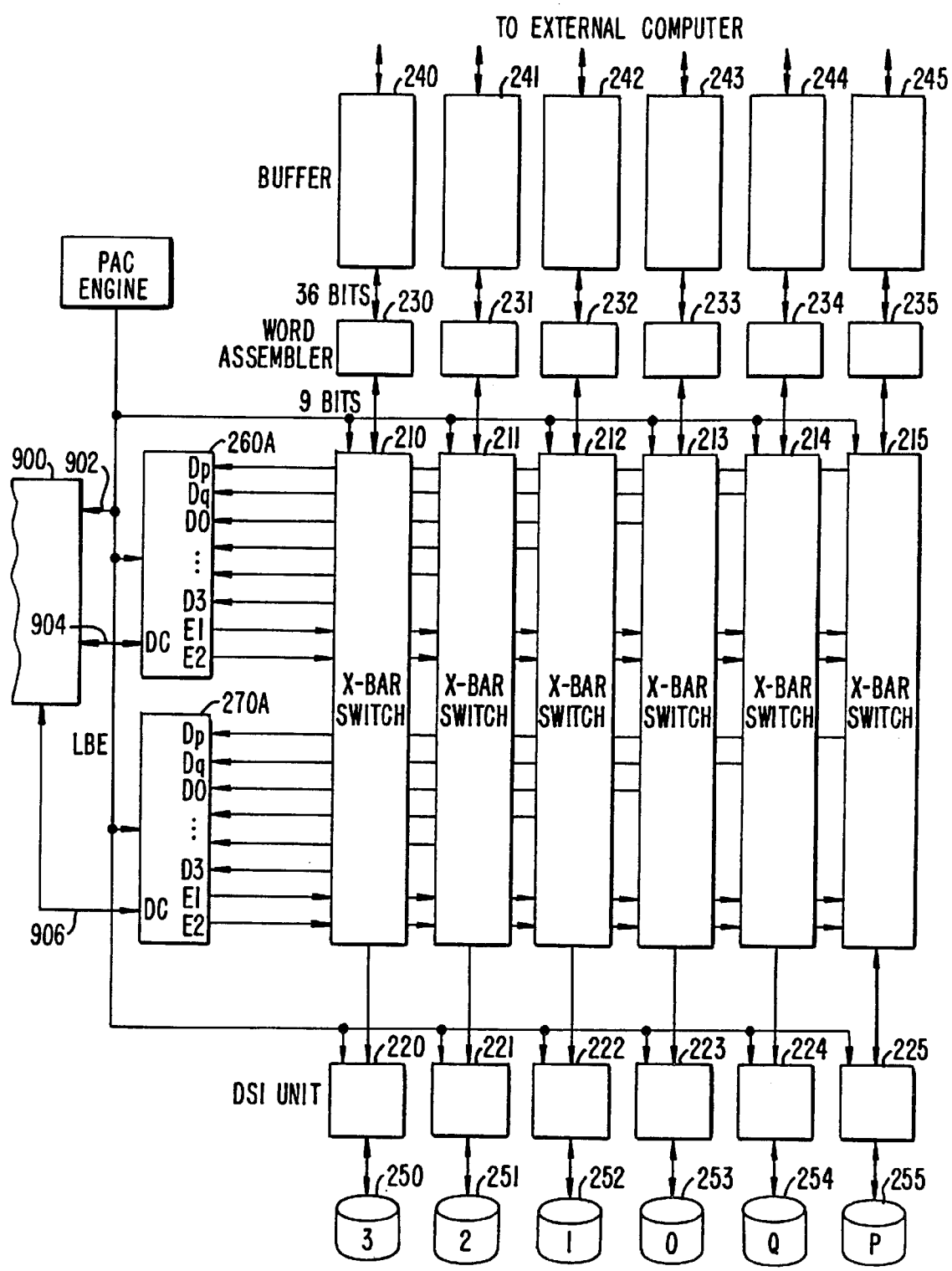
FIGS. 9 and 10 show examples of how cache memory can be incorporated into the circuitry of FIG. 2 in accordance with principles of the present invention.
Figure 10:
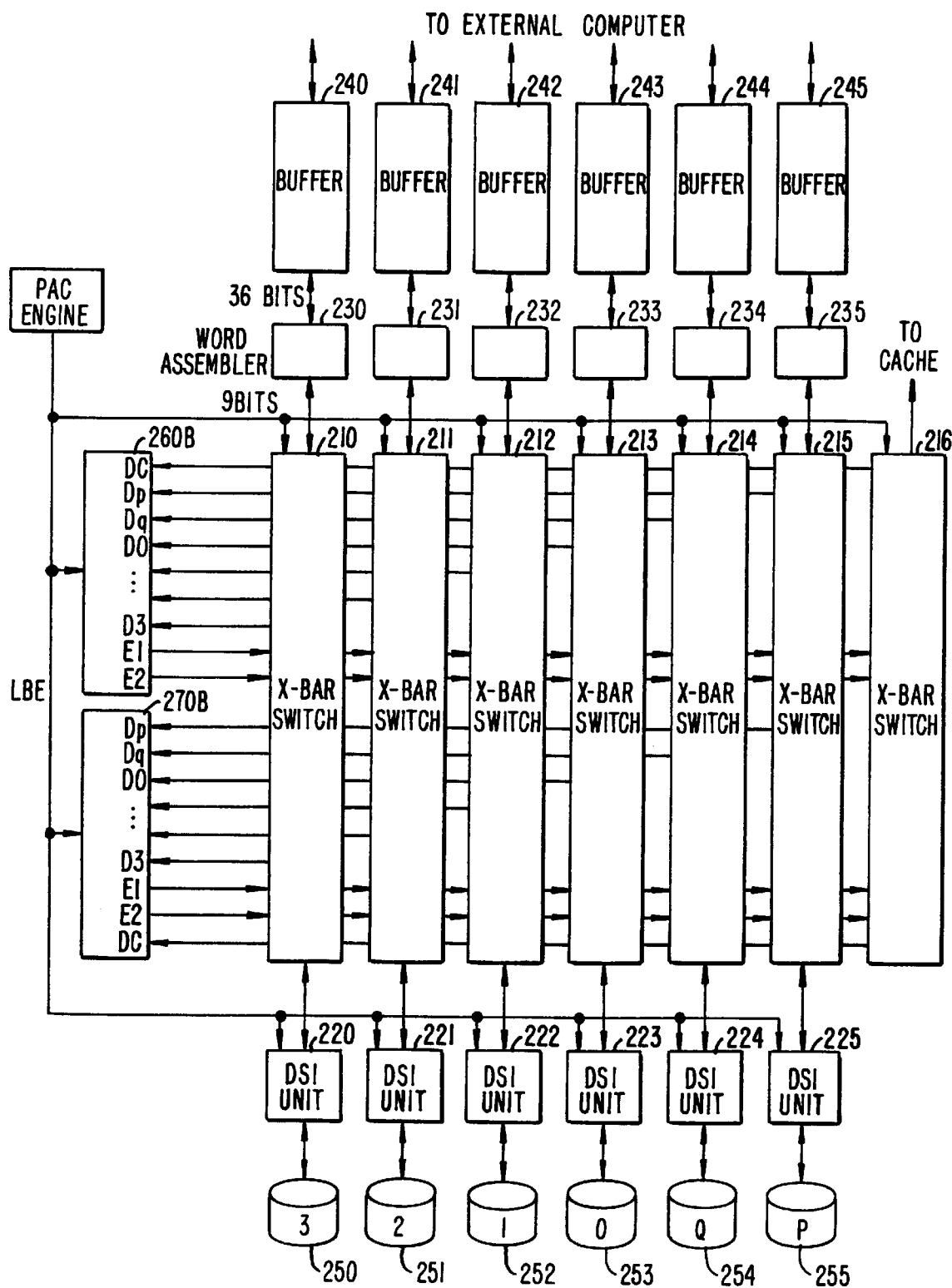

Implementation of the cache memory in the disk array system may also take various forms, as is illustrated by FIGS. 5–10. FIGS. 5–8 illustrate various exemplary ways that the cache memory may be attached to one or more ports of a second level controller. As shown in these figures, and as will be described in greater detail below, the cache memory may be implemented using one or more single or dual port memories, with or without an associated switch to selectively connect the cache memory to an alternative controller, and may be attached to a disk drive port or other type of port either exclusively or with other devices. FIGS. 9–10 illustrate exemplary ways that the cache memory may be interconnected with the switching and ACC circuits of FIG. 2, including by extension of the switching architecture or by another bus.

Figure 5:
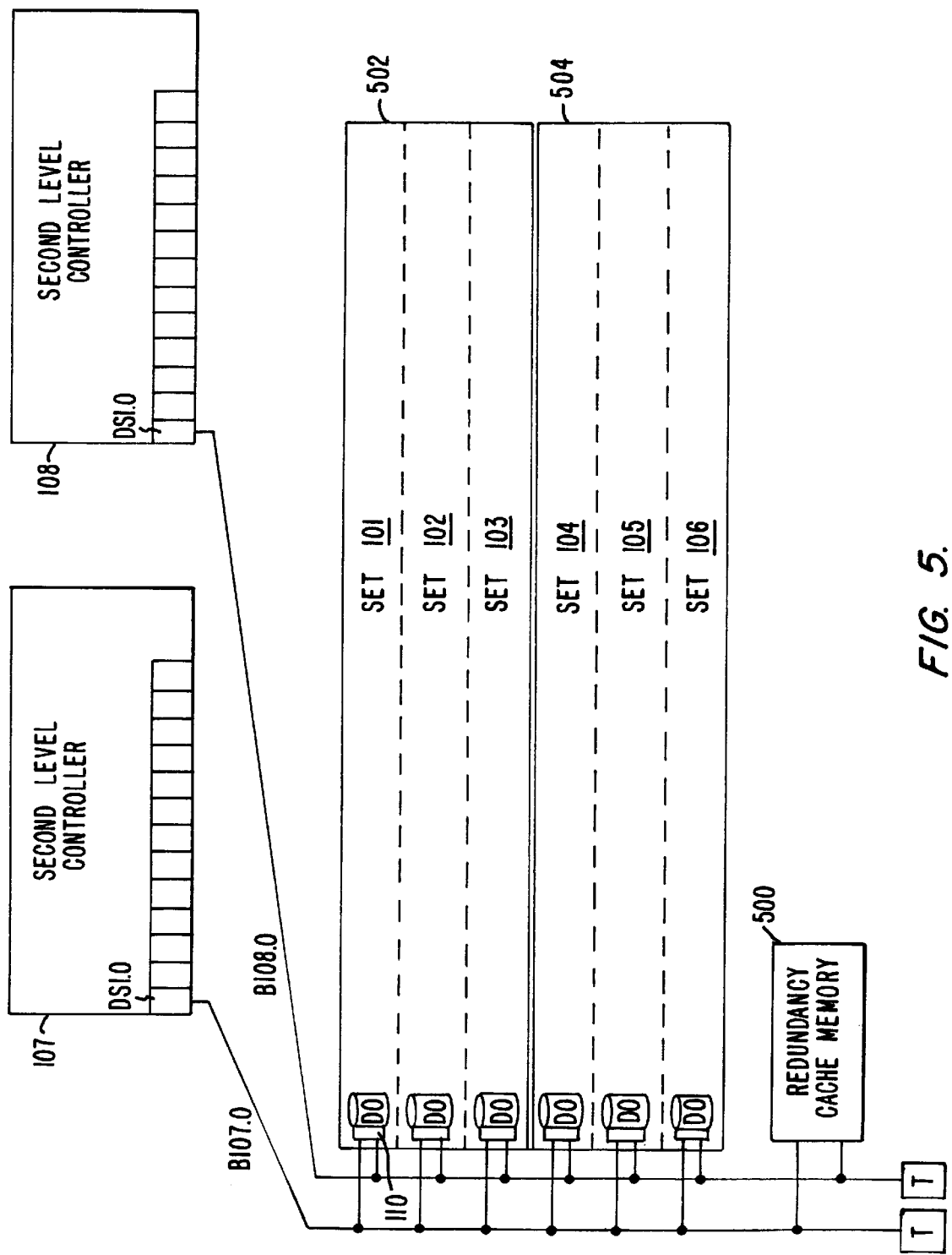
FIGS. 5, 6, 7A–C and 8A–C show exemplary ways in which cache memory can be incorporated into the array of FIG. 1 by attachment to one or more controller units in accordance with principles of the present invention.

More particularly, FIG. 5 shows a dual-port cache memory 500 having a first port connected to I/O bus B107.0 from controller 107 and a second port connected to I/O bus B108.0 from controller 108. Also connected to these buses are the switches 110 associated with drives D0 of disk drive sets 101–106. In FIG. 5, other I/O buses and other disk drives in the disk drive sets are not shown for simplicity, and sets 101–103 and 104–106 are shown divided into groups 502 and 504 respectively to reflect that group 502 is under primary control of controller 107 and group 504 is under primary control of controller 108. Cache memory 500 is addressable by each of controllers 107 and 108, which may apportion the cache memory for simultaneous use by both controllers. Alternatively, the controllers may determine between themselves that one or the other is to have exclusive use of the cache memory at different times based on relative differences in computer demands for access to the disk drives in the respective disk drive groups under their control.

Cache memory 500 may also be divided into multiple banks to store different types of redundancy terms (e.g., P and Q redundancy terms). In this case, assuming each controller has only a single communication path with cache memory 500 as shown in FIG. 5, controllers 107 and 108 would need to be modified to permit multiple types of redundancy terms to be transmitted via a single DSI unit. Although cache memory 500 is shown in FIG. 5 to be coupled to unit DSI.0 of each of controllers 107 and 108, it may be coupled alternatively to any other DSI unit of controllers 107 and 108. Because cache memory 500 shares I/O buses B107.0 and B108.0 with the Do disk drives in the configuration of FIG. 5, a controller cannot make (or receive) simultaneous data transmissions to (or from) a D0 disk drive and to (or from) cache memory 500. To minimize such potential contentions, cache memory 500 may be connected to I/O buses shared by spare disk drives.

Figure 6:
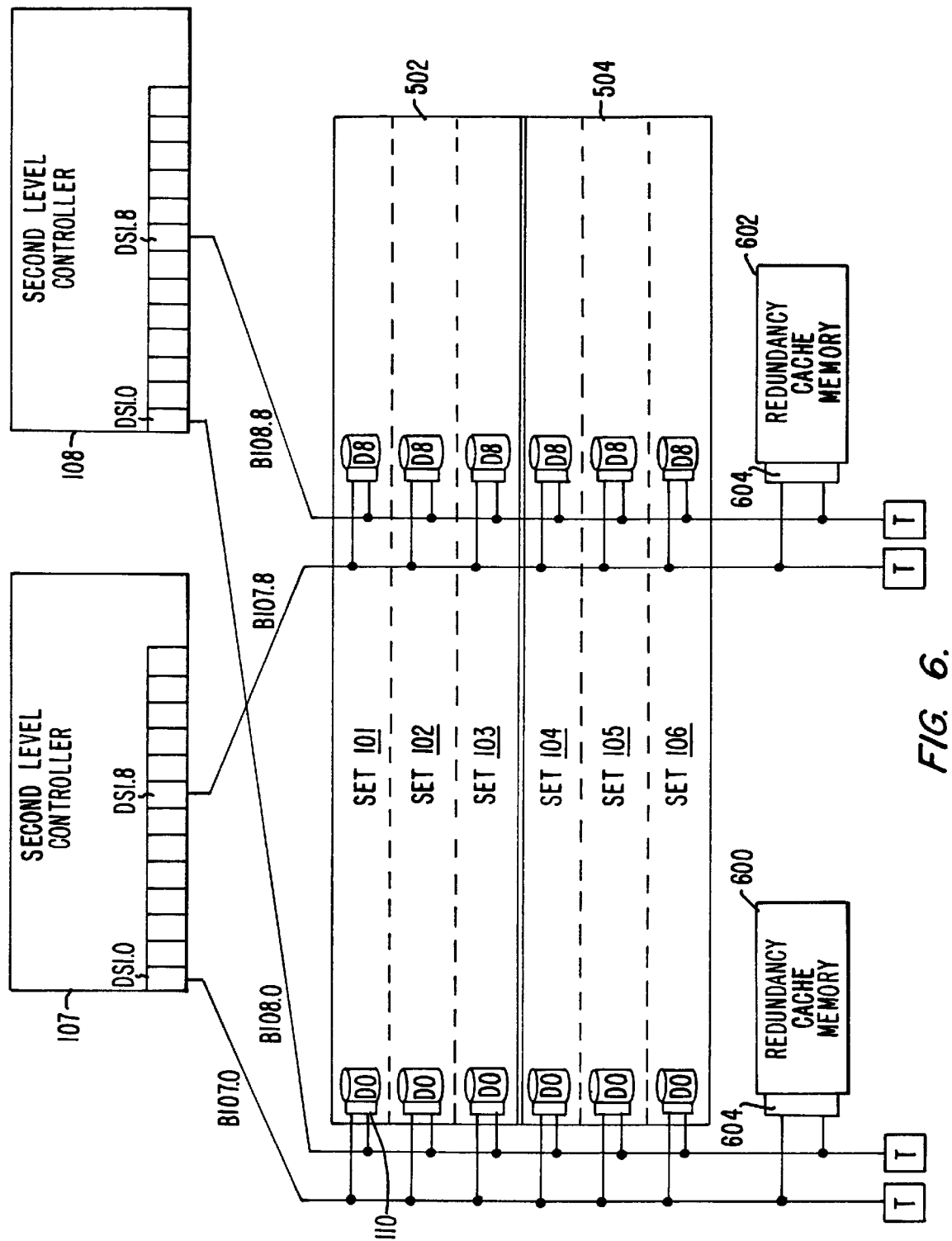

FIG. 6 shows that multiple cache memories 600 and 602 may be attached to each of controllers 107 and 108 to provide, for example, separate cache memories for different types of redundancy terms or separate cache memories for each controller. These cache memories may be dual port memories as shown in FIG. 5, or, as shown in FIG. 6, they may be single port memories with a switch 604 like switches 110 associated with the disk drives provided to selectively couple each cache memory to an I/O bus from controller 107 or an I/O bus from controller 108.

Figure 7A:
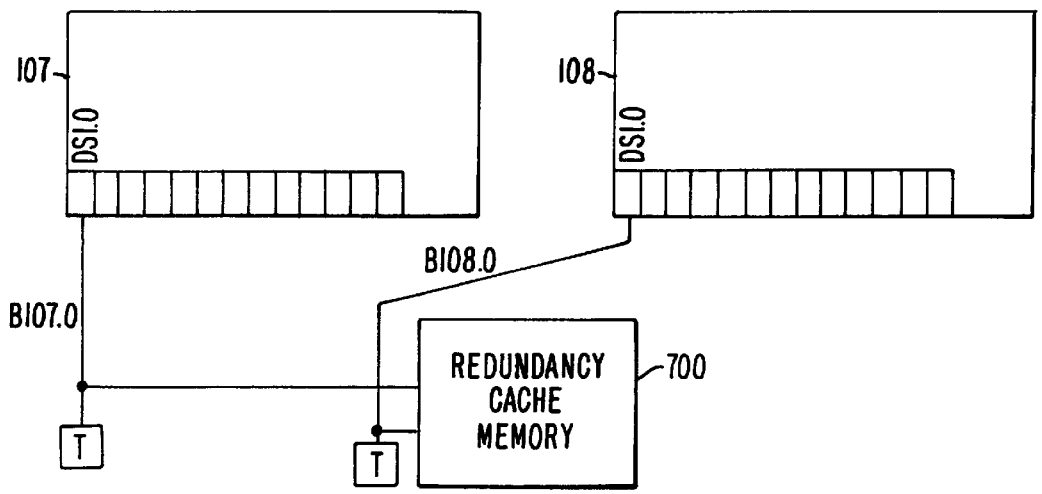
Figure 7B:
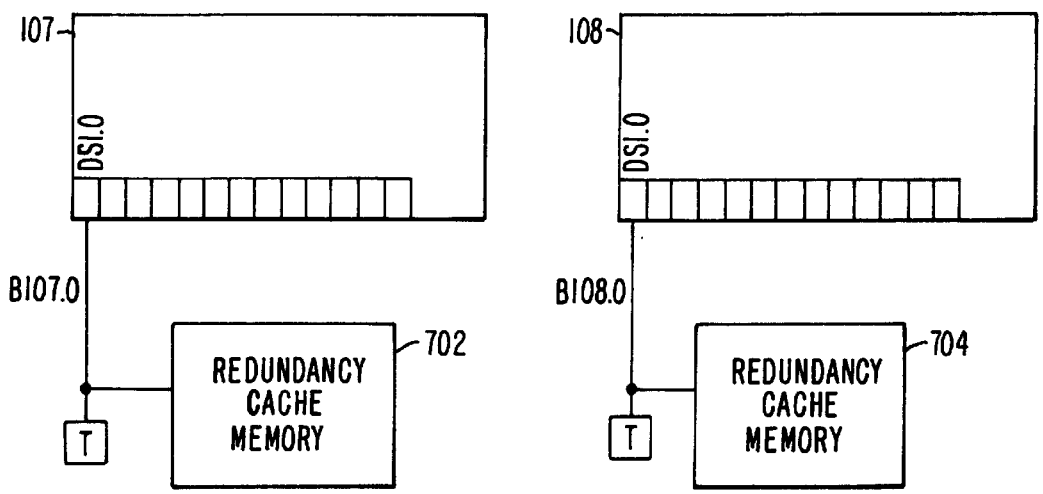
Figure 7C:
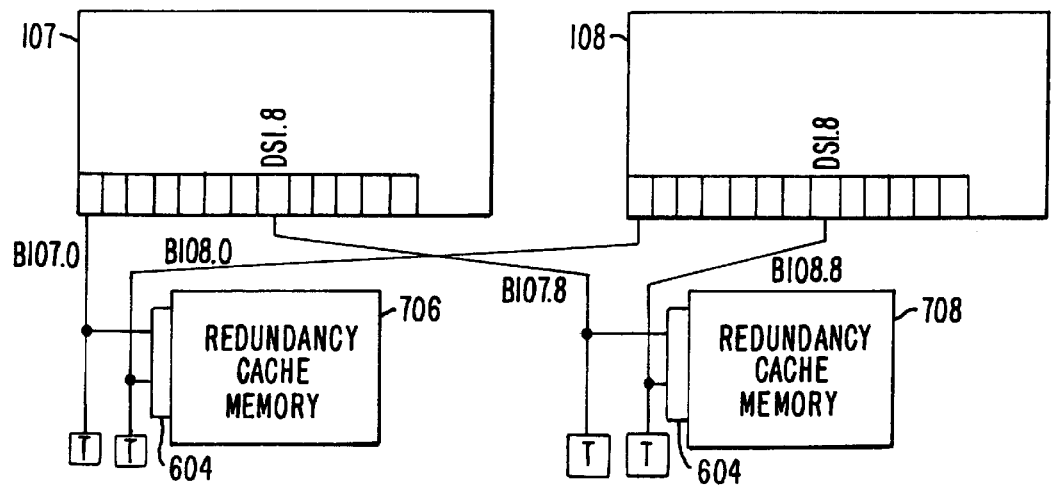

FIGS. 7A–C illustrate that one or more cache memories may be coupled in various ways to DSI units of controllers 107 and 108 without other disk drives being attached to the same DSI units. Although not shown in FIGS. 7A–C, disk drives may be connected to I/O buses extending from any other open DSI units of controllers 107 and 108 in the manner previously described. Thus, in FIGS. 7A–C, the cache memories replace one or more drive positions in each drive set connected to the controllers. FIG. 7A shows a dual port cache memory 700 having first and second ports connected respectively (and exclusively) to the DSI.0 units of controllers 107 and 108. FIG. 7B shows separate single port cache memories 702 and 704 connected respectively (and exclusively) to the DSI.0 units of controllers 107 and 108. FIG. 7C shows separate single port memories 706 and 708 respectively coupled by a switch 604 to the DSI.0 and DSI.8 units of controllers 107 and 108.

In accordance with principles of the present invention, the cache memory may be connected alternatively to a special memory port added to each of controllers 107 and 108, thereby eliminating the need to share a DSI unit with disk drives as shown in FIGS. 5 and 6 or to replace the disk drives at a DSI unit as shown in FIGS. 7A–C. The memory port may connect the cache memories to an extended switching network within controllers 107 and 108 (e.g., similar to a DSI unit), or to a bus, which, in either case, couples the cache memory directly or indirectly to the controller's ACC's and, as an option, to the data paths between the DSI units and the word assemblers. FIGS. 8A–C illustrate various ways that one or more cache memories may be coupled to memory ports of controllers 107 and 108. FIG. 8A shows a dual port cache memory 800 having first and second ports connected respectively to memory port 801 of controllers 107 and 108. FIG. 8B shows separate single port cache memories 802 and 804 connected respectively to memory port 801 of controllers 107 and 108. FIG. 8C shows separate single port memories 806 and 808 respectively coupled by a switch 604 to dual memory port 803 of each of controllers 107 and 108.

Although the cache memory of the present invention may be incorporated into disk array system 100 without significant hardware changes simply by attaching the cache memory to an existing DSI unit as previously shown and described, alternative modifications may be made to switching and ACC circuitry of controllers 107 and 108 to incorporate the cache memory in to the system, including modifications that permit the cache memory to be implemented as an internal memory. FIG. 9 illustrates, for example, how a cache memory 900 may be coupled by buses 902, 904 and 906 to the PAC engine and to ACC circuits 260A and 270A, respectively. ACC circuits 260A and 270A have been modified to provide each with a port labelled $D_c$ for receiving and transmitting redundancy information (and, optionally, data). The PAC engine may provide control information to cache memory 900 via registers connected to bus 902. Cache memory 900 may be an internal memory of the controller which is directly connected as shown in FIG. 9, or it may be an external memory which is connected to buses 902, 904 and 906 through a memory port (e.g., port 801 or 803 of FIG. 8).

FIG. 10 illustrates another alternative for incorporating a cache memory in which the switching architecture of FIG. 2 is extended to include X-bar switch 216. Switch 216 couples the cache memory to ports E1, E2 and $D_c$ of ACC circuits 260B and 270B, and can be configured to interconnect with any of X-bar switches 210–215 to couple data or redundancy information between the cache memory and any DSI unit or word assembler.

One skilled in the art will appreciate that the present invention can be practiced by other than the described embodiments, which are presented for purposes of illustration and not of limitation, and the present invention is limited only by the claims which follow.

We claim:

1. A system for storing data in a redundant array of mass storage devices, comprising:

a plurality of mass storage devices;

a controller coupled to the plurality of mass storage devices, said controller providing a set of controlled data paths between an external data source and said plurality of mass storage devices;

an error detection circuit coupled to said set of controlled data paths, wherein said error detection circuit calculates at least one error detection term based on a group of data terms which are received by said controller from said external data source and which said controller distributes among multiple ones of said plurality of mass storage devices for storage via said set of controlled data paths; and a cache memory coupled to said error detection circuit in which said at least one error detection term is stored;

wherein said controller is configured to retrieve said error detection term from said cache memory, and retrieve said group of data terms from said mass storage devices, for a read-modify-write operation.

2. The system of claim 1, wherein:

said cache memory is coupled to said error detection circuit via an interface port of said controller.

3. The system of claim 2, wherein the cache memory is coupled to the interface port by a bus shared by at least one of the plurality of mass storage devices.

4. The system of claim 3, wherein the cache memory shares the bus with a spare mass storage device.

5. The system of claim 2, wherein the interface port is a dedicated memory port.

6. The system of claim 1, wherein the set of controlled data paths comprise a plurality of switches that interconnect the controlled data paths, said error detection circuit, and said cache memory.

7. The system of claim 1, wherein said cache memory circuit is directly connected to said error detection circuit by a bus.

8. The system of claim 1 wherein said cache memory is connected to said controller independently of a bus to an external host computer.

9. The system of claim 1 wherein:

said controller comprises first and second controller devices each coupled to the plurality of mass storage devices;

said error detection circuit comprises first and second error detection circuits in each of said first and second controller devices; and said cache memory is coupled to the first and second error detection circuits.

10. The system of claim 9, wherein said cache memory is coupled to the error detection circuits in the first and second controllers by first and second buses, respectively.

11. The system of claim 10, further comprising switching means connected between said cache memory and said first and second buses for selectively coupling said cache memory to either said first or second bus.

12. A system for storing data in a redundant array of mass storage devices, comprising:

a plurality of mass storage means;

control means coupled to the plurality of mass storage means for providing control of data flow between said plurality of mass storage means and an external data source;

error detection means coupled to said control means and said plurality of mass storage means for calculating at least one error detection term based on a group of data terms which are received by said control means from said external data source and which said control means distributes among multiple ones of said plurality of mass storage means for storage; and memory means coupled to said error detection means for caching said at least one error detection term, said cached at least one error detection term being accessed from said memory means for transfer to said error detection means when new data for any of said group of data terms is received by said control means from said external data source;

wherein said control means is configured to retrieve said error detection term from said memory means, and retrieve said group of data terms from said mass storage means, for a read-modify-write operation.

13. The system of claim 12, wherein said cache memory means comprises multiple cache memories.

14. A method for storing data in a redundant array of mass storage devices, comprising:

receiving a group of data terms from an external source;

calculating at least one error detection term based on said group of data terms;

distributing said group of data terms among multiple ones of an array of mass storage devices for storage therein;

storing said at least one error detection term in a cache memory; and accessing said at least one error detection term from said cache memory, if it is still present, when new data for any of said group of data terms is received to calculate at least one new error detection term for said group of data terms, while accessing data terms from said mass storage devices.

15. The method of claim 14, further comprising the step of storing said new redundancy term in said cache memory.

* * * * *